Feb. 5, 1935. B. WALKER 1,990,150
VEHICLE LIFTING AND TRAVERSING DEVICE
Filed March 21, 1932 3 Sheets-Sheet 2

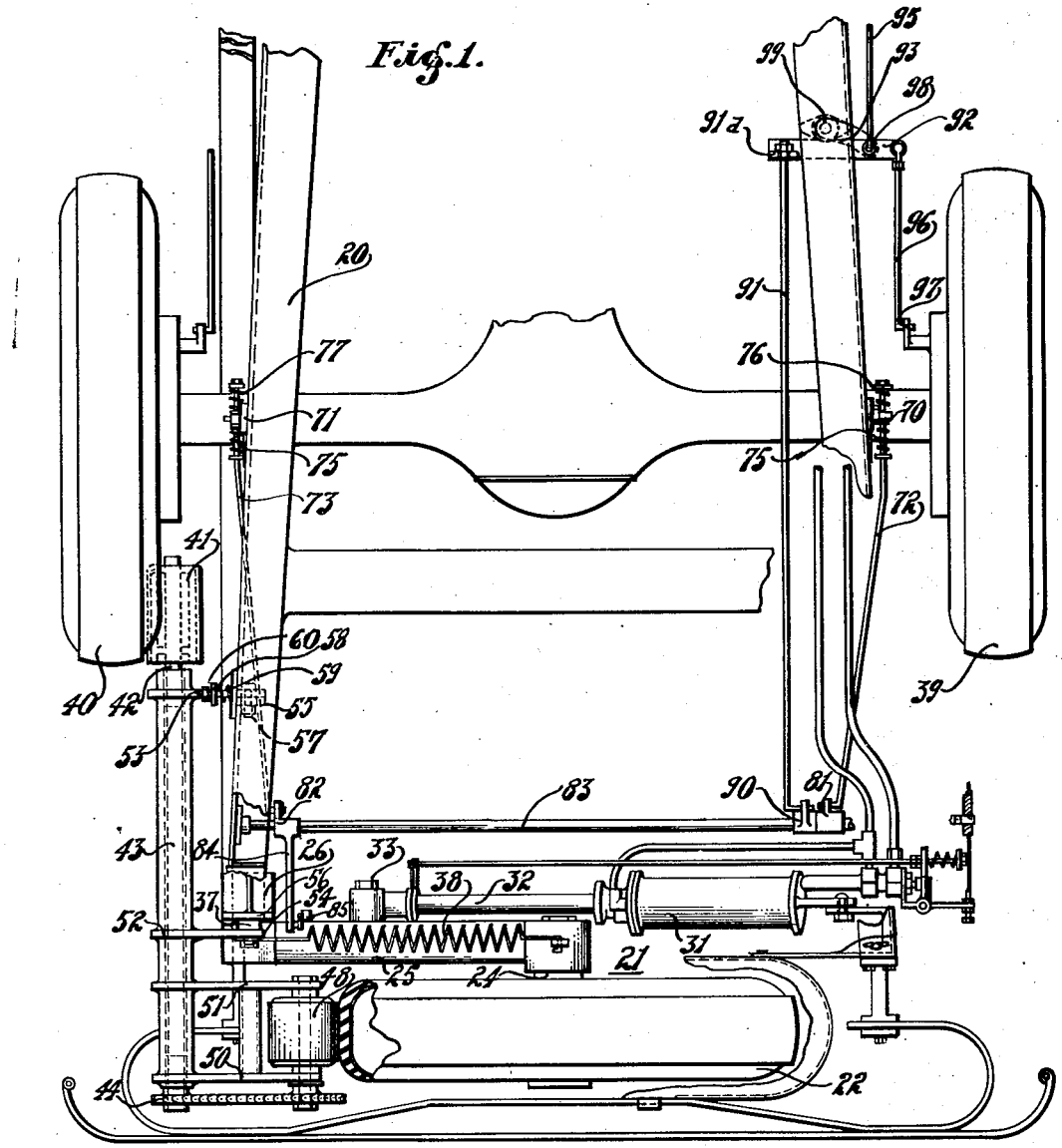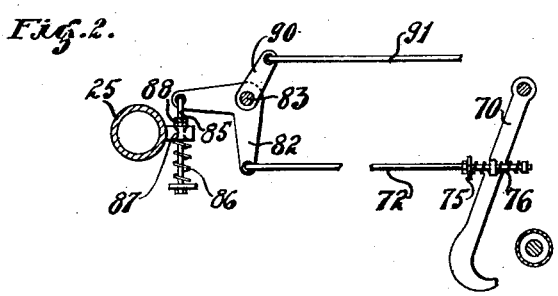

INVENTOR.
Brooks Walker

Feb. 5, 1935.    B. WALKER    1,990,150
VEHICLE LIFTING AND TRAVERSING DEVICE
Filed March 21, 1932    3 Sheets-Sheet 3

INVENTOR.
Brooks Walker

Patented Feb. 5, 1935

1,990,150

UNITED STATES PATENT OFFICE 1,990,150

VEHICLE LIFTING AND TRAVERSING DEVICE

Brooks Walker, Piedmont, Calif.

Application March 21, 1932, Serial No. 600,126

18 Claims. (Cl. 180—1)

My invention relates to vehicle lifting and traversing devices, and particularly to a device which employs a single wheel for raising one end of the vehicle and for driving it in an arc about a point adjacent to the opposite end thereof. My invention further relates to improvements in the mechanism for operating vehicle lifting devices in general and particularly to those of the class described in my co-pending application entitled Vehicle lifting and traversing device, Serial #535,381, filed May 6, 1931. My present invention relates particularly to simplified means for driving the vehicle when one end is supported on the single wheel, simplified means for actuating the stabilizing means at the unelevated end of the vehicle and to an improved hydraulic means for actuating and controlling said lifting device.

The main objects of my invention are: to provide a lifting and traversing device for a vehicle with particular reference to the single wheel type, of an actuating mechanism for the auxiliary wheel to effect the raising of one end of the vehicle in a manner wherein the fluid pressure in the pump circuit is eliminated when the vehicle has reached the fully elevated position; to provide a simplified means of driving the vehicle when elevated on the auxiliary wheel which is of a simpler and cheaper construction and more readily adapted to conventional motor vehicles than any method previously known in the art; to provide a suitable mechanism applying the brake to one of the elevated vehicle wheels so that power may be taken from the other elevated vehicle wheel to actuate the traversing mechanism, said braking means being effective regardless of the normal manual brake controls, to provide a more simplified, positive and rattle-proof method of actuating the stabilizers at the unelevated end of the vehicle; to provide a suitable cover for the auxiliary wheel which shall be preferably of a rigid material and so formed as to cover a major portion of the ground engagement surface as viewed from the rear of the car, and still be so formed or constructed as to allow the wheel to raise and lower from its partially inclosed position to its ground engaging position while the tire cover is attached to the vehicle chassis; to provide means whereby the tire cover may be readily removed preferably without the use of tools for the interchange of wheels in case of a flat tire or other causes; to provide a support which may be carried in the vehicle and be attached to the vehicle lifting device in place of the auxiliary wheel to enable the vehicle to be lifted by the power mechanism when the auxiliary wheel has been removed for interchange purposes.

Other objects and features of novelty of my invention will be either specifically pointed out or will become apparent when referring, for a better understanding of my invention, to the following description in conjunction with the accompanying drawings, wherein:

Figure 1 is a plan view, partly cut away, of the rear portion of a motor vehicle, incorporating part of the invention, shown with the wheel in its vehicle lifted position.

Figure 2 is a partial elevation view, partly in section, showing the mechanism for actuating the axle hooks and brake.

Figure 4:
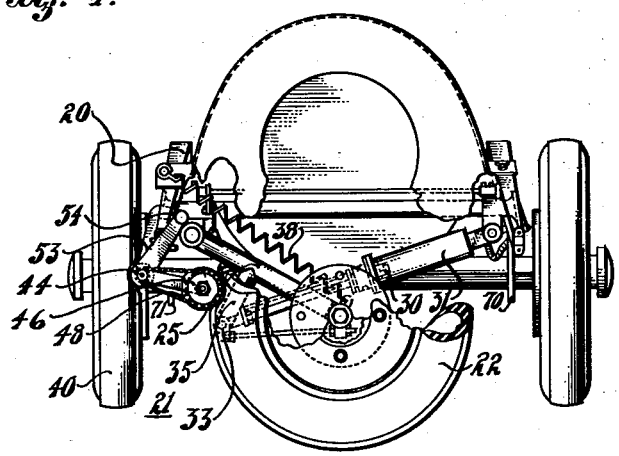
Figure 4 is a similar view, also partly cut away, showing the spare wheel in its ground engaging position and with the bumper removed.
Figure 3:
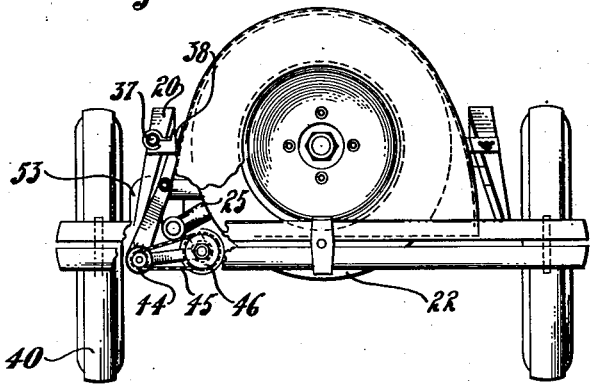
Figure 3 is a rear elevation view, partly cut away, to show the driving mechanism of the motor vehicle incorporating the invention, wherein the auxiliary wheel is shown in its elevated position, partially inclosed by the tire cover.

Referring to Figures 1, 2, 3, and 4, I have illustrated an automotive vehicle chassis 20 having a lifting and traversing device 21 which is provided with a single wheel 22, upon which the vehicle is raised and traversed in an arc about the opposite end of the vehicle. In these views, I have illustrated the use of a spare wheel such as is employed in automotive vehicles, as the wheel upon which one end of the vehicle is supported, although it is to be understood that the use of the spare wheel in this connection is not essential to the invention, although it will probably be preferable and cheaper to use the spare wheel. The spare wheel 22 is mounted for rotation about an axle 24, extending rearwardly from the arm 25 which is pivotally attached to the vehicle chassis at the bearing 26. Within the cylinder 31 is reciprocally mounted a piston 30 which is rigidly attached to the piston rod 32, which is in turn pivotally attached to an extension 35 of the arm 25 by the bolt 33 in such a manner that a fluid pressure against the piston will cause the piston rod to project from the cylinder and actuate the arm 25 in such a manner that the wheel 22 supported thereon will be caused to lower into ground engagement and upon continued movement thereof will cause a lifting of one end of the vehicle chassis away from the ground. The construction so far is in general similar to that described in my co-pending application above referred to. A mechanism is provided for driving engagement between one of the driven wheels 40 of the vehicle and the auxiliary wheel 22. This consists of a roller 41 adapted for engagement with the rear wheel 40, said roller being firmly attached to a shaft 42, which is rotatably mounted in suitable bearings in the housing 43. At the opposite end of the shaft 42 is rigidly attached a sprocket 44 which is attached to a second sprocket 46 by the chain 45. The sprocket 46 is rigidly attached to the shaft 47, which is in turn rigidly attached to the roller 48. The shaft 47 is mounted for rotation in suitable bearings in the arms 50 and 51, which arms are rigidly attached to the housing 43. Two arms 52 and 53 are likewise firmly attached to the housing 43 by some suitable means such as welding and carry at their upper end pivot bolts 54 and 55 respectively, which bolts are rigidly attached to the vehicle chassis by suitable brackets 56 and 57 respectively. An ear 58 extends upwardly from the arm 53 and is acted upon by a spring 59 and a bolt 60 in such a manner that the spring causes a partial rotation of the driving mechanism to the position shown in Figure 3, wherein the rollers 41 and 48 are out of engagement with the rear wheel 40 and the auxiliary wheel 22 respectively, when the rear wheel 22 is in its inactive position. By virtue of the suitable pivotal mounting of the driving mechanism on the bolts 54 and 55, it will be seen that the mechanism is adapted to be engaged by the wheel 22 by its arcuate lowering operation and the pressure exerted on the roller 48 will result in a substantially equal reaction of the roller 41 against the rear tire wheel 40 where by suitable arrangement a pressure sufficiently high to be satisfactory as a friction driving means may be established between the two rollers and their respective wheels. It will be noted that this construction is particularly adapted to conventional type automotive vehicles and does not require the addition of any extra actuating mechanism other than the use of the vertical movement of the auxiliary wheel into ground engagement. It is essentially a quiet drive and does not necessitate mechanism for meshing gears, splines, etc. Axle engaging hooks 70 and 71 are pivotally attached to the vehicle chassis and are yieldably actuated by the control rods 72 and 73 respectively through suitable springs 74 and 75 which are necessary to take care of a possible nonengagement of the hooks in case one wheel is dropped into a depression, lowering it more than the normal clearance of approximately 1¼" that I have found to be generally most satisfactory. Additional springs 76 and 77 are provided against motion in the retracting direction to take care of the possibility of an attempt to retract the hooks when the vehicle chassis is supported on a chain block for repairs, etc. The rods 72 and 73 are actuated by arms 81 and 82 which are rigidly attached to the shaft 83, which is rotatably mounted in suitable bearings on the vehicle chassis. The arm 82 carries an extension 84 which is suitably connected to the arm 25 by means of the rod 85, the swivel connection 87 and the spring 86, and the stop nuts 88. From this it will be seen that when the arm 25 raises to bring the wheel 22 into inactive position the shaft 83 will be caused to rotate to cause the hooks to disengage the rear axle. An additional arm 90 is rigidly mounted on the shaft 83 and carries one end of a pull rod 91, the other end of which engages a control lever 92, through a suitable slip joint 91A, which is pivotally mounted on the brake swivel 93 such as is generally employed on vehicle brake mechanism adjacent the forward, rear spring hanger. Control rod 95 extends forward to the mechanism for actuating the brakes either by hand or by foot. A rod 96 extends rearwardly to the brake cam lever 97 of any conventional form. In the operation of this mechanism, the partial rotation of the shaft 83 resulting from the lowering of the arm 25 causes a rearward movement of the rod 91, which in turn causes the control lever 92 to pivot about the pin 98 which carries one end of the brake rod 95. This pivotal movement of the control lever causes the rod 96 to pull the brake on the rear wheel 39 to prevent its rotation so that through the differential of the rear axle positive rotation of the driving wheel 40 may be obtained in either direction by the use of low and reverse gears of the transmission to effect a swinging of the car in either direction when elevated on the auxiliary wheel 22. It is preferable in this construction that the distance from the pivot pin 99 to the attachment of rod 91 by approximately equal to the distance from the pin 99 to the pin 98 so that in the event that the hand brake of the car actuates the rear brakes through rod 95 and the brake is set tight when the vehicle is being lifted, an excessive pressure will not be applied to the braking mechanism. This is due to the fact that as the hand brake is set the end of the arm 92 which is attached to the slip joint 91A, will move rearwardly until the hand or foot brake is released. However, as the car is raised this slack is taken up and a brake on wheel 39 is firmly set so that when it is desired to swing the car to the right or to the left as soon as the hand or foot brake is released, wheel 40 will be free to rotate while wheel 39 will be locked. However, the vehicle may be stopped from swinging at any time in either direction by applying either the hand or foot brake which locks or restricts the rotation of wheel 40 and wheel 22 through the driving mechanism previously described. In this construction a spring 38 has been provided, one end of which is attached to the arm 25 at a point adjacent the axle 24 and the other end of which is attached to a bolt 37 which is carried on the vehicle chassis preferably in a manner as illustrated wherein the leverage of the spring is greatest when the tension is the least and vice-versa. This spring has sufficient tension to retract the wheel 22 to the position shown in Figure 3 with a generous additional tension to prevent rattles and assure a positive and speedy return of the mechanism to its inactive position whenever the controls are placed in the return position without the necessity of engine power application to perform this function.

Figure 5A:
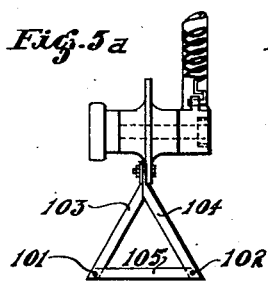
Figure 5A is a side elevation view of the device shown in Figure 5.
Figure 5:
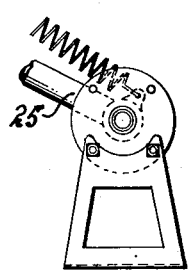
Figure 5 is a similar view in more diagrammatic form of the auxiliary support attached to the lifting device in place of the auxiliary wheel when said wheel is to be used for interchange purposes with the vehicle wheels.

In Figures 5 and 5A I have shown two views of a type of auxiliary support 100 which is preferably made of a collapsible construction so that it can be folded up into a compact space to fit into a conventional tool box of a motor vehicle when not in use. For this purpose I have shown one preferred form of construction wherein the two supporting plates 103 and 104 are attached to the base plate 105 by means of suitable hinge pins 101 and 102 respectively. When folded into the shape shown in these figures and supported on the hub which normally carries the spare wheel 22 by one or more of the bolts of the hub flange which normally holds the wheel 22 to the hub, a substantially rigid structure is obtained which is very suitable for lifting the rear wheels of the vehicle out of ground contact when the spare wheel has been removed and the auxiliary support 100 substituted therefore, when in the position shown in Figure 4. This will make it possible to interchange the wheel 22 with either of the rear wheels for tire change purposes or damage to the wheels which might necessitate a change. When the hub is raised to the position shown in Figure 3, the auxiliary support 100 may be readily removed by removing the two bolts attaching it to the hub. When these two bolts are removed the upper ends of the side plates 103 and 104, being movable with respect to each other, are then capable of being folded over on the base plate 105 for more compact storage.

Figure 6:
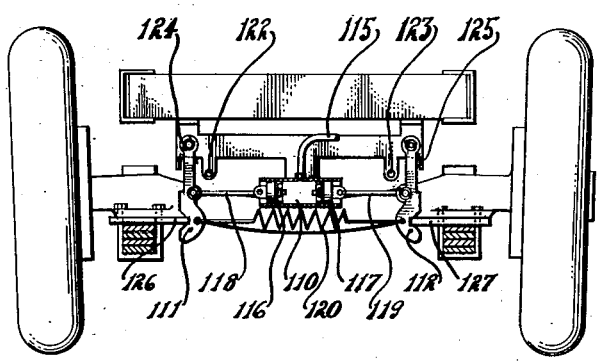
Figure 6 is a sectional elevation view taken just rearwardly of the front axle, looking toward the front of the vehicle, which view shows the improved mechanism for engaging the front end stabilizers and eliminating the front spring action when the vehicle is elevated on the lifting mechanism and showing the stabilizers in their locked position.

In Figure 6, I have shown an improved type of stabilizer for anchoring the front end of the vehicle frame to the front wheels of the vehicle which action takes place automatically when the rear end of the vehicle is lifted on the auxiliary wheel as shown in Figure 4. When the fluid pressure acts on the cylinder 31 to lift the car on the auxiliary wheel and interconnecting pipe 115 connects the chamber within the cylinder 31 with the inside of cylinder 110, the fluid pressure that is effective within the cylinder 31 to raise and support the vehicle on the lifting device is also effective within the cylinder 110 because of the intercommunicating pipe 115. The cylinder 110 is preferably of the double ended type having two pistons therein 116 and 117 each directly connected with the axle locks 111 and 112 respectively by means of the connecting rods 118 and 119 respectively. A spring 120 is connected between the two axle locks 111 and 112 to retract them out of engagement with the axle when there is no fluid pressure within the cylinder 110. Two stops 122 and 123 are provided for limiting the motion of the axle locks 111 and 112 respectively so that the spring 110 may retract both locks to the same inactive position. Additional stops 124 and 125 are provided for limiting the maximum outward travel of the locks 111 and 112 respectively in case either lock should miss the axle projections 126 and 127, against which the axle locks 111 and 112 respectively, engage as shown in this figure. This condition might possibly occur in case one of the front wheels dropped into a depression sufficient to allow one of the axle hooks like 112 to miss the axle projection 127. This stop is necessary to prevent the possibility of the piston 117 and its attached cup leather from being forced out of the cylinder 110. It is of course obvious that the stop could be placed at the end of the cylinder itself or at any other convenient place to render the same function and that the operation of both sides is similar in this respect. The advantage of this construction is the elimination of control rods with the possibility of rattles, the utilization of a simple open ended cylinder and the simplicity of double acting pistons acting directly on the locking mechanism, the ease with which relatively high pressures are obtained to obtain this locking without mechanically transferring the motion from the lifting device to the front end of the vehicle.

Figure 7:
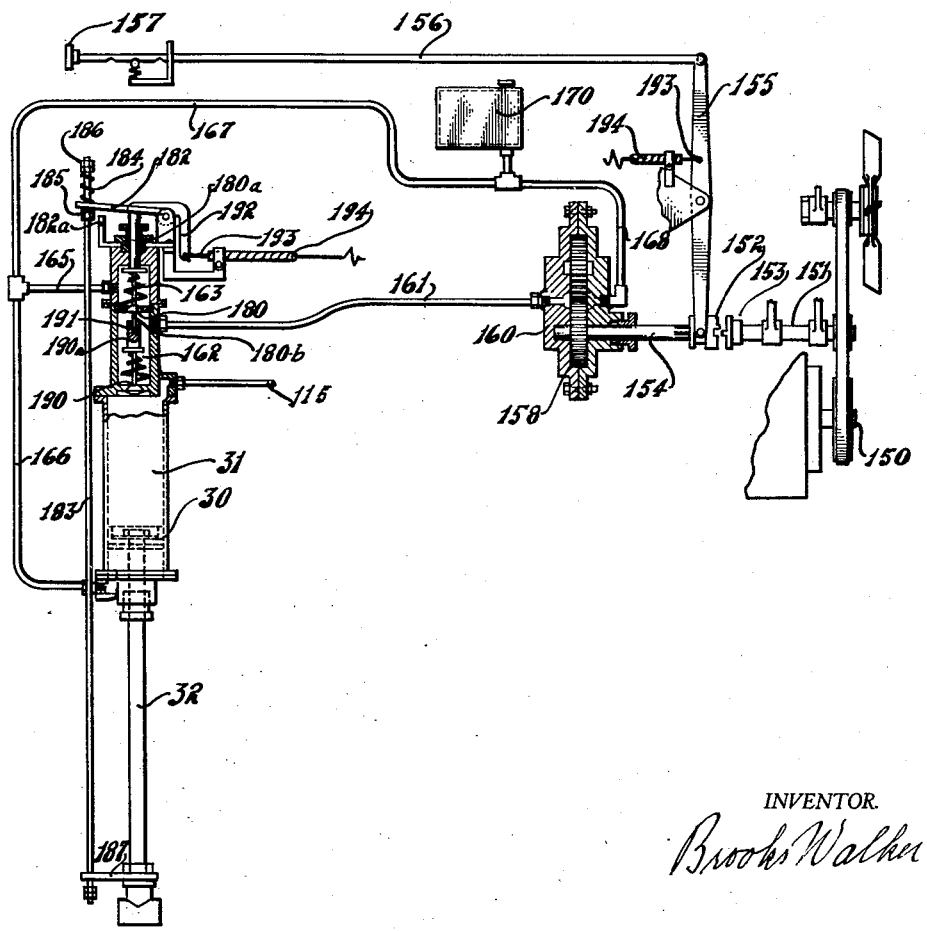
Figure 7 is a view, partly in section and partly in elevation of the operating and actuating mechanism which may be employed with my lifting and traversing device.

In Figure 7, I have illustrated a type of hydraulic circuit which may be applied to this invention, but which is not limited to this construction as it is applicable to tilting bodies as used on dump trucks, retractable landing gears as used on airplanes, or any other purpose wherein a fluid actuated cylinder is utilized in connection with a power driven pump as a source of power or motion. In this case, we have a power driven shaft 150 such as the engine crank shaft, an auxiliary shaft 151 driven by any suitable means which for utility purpose on an automotive vehicle may preferably be the generator shaft, a clutch composed of a driving member 153 and a driven member 152; the driven member 152 may be slideable on a spline shaft 154. Its motion is controlled by the control lever 155 and the control rod 156 and the control button 157 which is preferably located in the driver's compartment of the vehicle or any place accessible to the operator. The spline shaft 154 preferably carries on its opposite end a gear 158 which forms one of the two gears of a conventional type gear pump inclosed in a housing 160 of any conventional form. However any type of pump may be used in this construction, such as for example a vane, or one of the piston or centrifugal type, as long as it is capable of supplying the the sufficient volume and pressure required by the system. A discharge pipe 161 connects the discharge side of the pump with a high pressure chamber 162 of the control valve which may preferably be located adjacent the cylinder head although it may be located at the pump if an economy of piping is desired. A low pressure chamber 163 is provided above the high pressure chamber 162 and this chamber 163 is connected by means of a low pressure pipe 165 to a pipe 166 continuously communicating with the back side of the piston 30 of the cylinder 31 and also with the pipe 167 which is connected with a reservoir 170. A spring loaded check valve 180 carries a stem 180a which passes through a stuffing box at the upper end of the low pressure chamber 163. An extension of this stem 180b protrudes below the valve 180 and rides in a running fit in the upper end 190a of the spring loaded check valve which closes the lower end of the high pressure chamber 162. It is to be noted that a small clearance 191 exists between the end of the stem 180b and the end of the hole in the stem 190a. This clearance is sufficient to allow the valve 180 to be unseated to a sufficient extent to allow a substantially free passage of fluid from the high pressure chamber 162 into the low pressure chamber 163 without unseating the valve 190. A control arm 182 is pivoted at one end and contacts the valve stem 180a. The other end of this control arm carries a control rod 183 which is connected thereto by means of a snap spring 184 and stop nuts 185 and 186 which are preferably adjustable. The opposite end of the control rod 183 is carried in a bracket 187 which is rigidly mounted on the piston rod 132. An additional control arm 192 is pivoted at the same pivot point that is used on the control arm 182 and has one end in working connection with the valve stem 180a, and the other end connected to a suitable pull wire 193 which may be inclosed in a flexible cable 194 or any other suitable means of connecting the control arm 192 with the control lever 155.

The operation of the device is as follows: When it is desired to extend the piston rod from the cylinder, as when the car is to be raised, the control button 157 is pulled back from the neutral position shown to the clutch engaged position which will start the pump operating. Fuid will then flow from the reservoir 170 through the intake pipe 168 through the pump and thence under pressure through the pipe 161 into the pressure chamber 162. From there it will flow through the check valve 190 as long as the check valve 180 is seated. This will cause the piston rod 32 to be extended until the bracket 187 strikes the end of the rod 183 which will cause an initial motion of the rod 183 compressing the spring 184 as the motion of the control lever 182 is resisted by the spring of the valve 180 and the fluid pressure acting on the lower surface of the valve 180. However, when the spring 184 reaches a sufficient tension to overcome this force, or when the coils of the spring 184 bottom, the spring 184 will cause the valve 180 to snap open to an amount determined by the clearance between the control arm 182 and the stop 182a against which it strikes. This is sufficient to allow a free passage of fluid by the valve 180, but not sufficient to allow the stem 180b to strike the end of the hole in the stem 190a, so that the valve 190 will maintain the piston rod 32 in the full extended position while at the same time the entire fluid pressure is instantaneously removed from the pressure side of the pump. The pipe 115 communicates continuously with the pressure cavity of the cylinder 31 and the interior of the cylinder 110 which last mentioned cylinder operates the front hooks as illustrated in Figure 6 or any other auxiliary mechanism such as the gear drive engagement or the free wheeling lockout as illustrated in the previously referred to copending application. The control button 157 may next be returned to the position shown in Figure 7 which will maintain the car supported in its existing position with the pump disconnected. Any manoeuvers of the device to swing the car to the right or left may then be accomplished through the conventional gear transmission as previously described. When it is desired to lower the vehicle and retract the lifting mechanism, the control button 157 is pushed all the way forward. This motion through the interconnecting means causes the control lever 192 to be partially rotated thereby causing a further movement of the valve stem 180a than was possible by means of the lever 182 on account of the stop 182a. This further movement of the stem 180a, the valve 180 and the lower stem 180b, causes the stem 180b to strike the end of the hole in the stem 190a and to force the valve 190 open thereby providing a free passage for the fluid within the pressure side of the cylinder 31 back to the reservoir 170 and to the low pressure side of the piston 30. The degree to which this valve 190 may be opened to control the speed of retraction can be determined by the length of the controls in the operating mechanism. The retraction of the piston rod 32 is effective by the weight of the vehicle and by the spring 38 as previously described. The advantages of this system are the positive holding of the piston in a given position by means of the check valve, the elimination of the fluid pressure in the pump circuit when the piston reaches the end of the stroke, which allows easy disengagement of the driving clutch, both of these functions performed with the necessity of only a single stuffing box on the valve mechanism, and a generally simplified and cheaper accomplishment of these functions than was heretofore possible.

While I have described and illustrated several embodiments of my invention, it will be apparent to those skilled in the art that various changes, additions, omissions and substitutions may be made therein without departing from the spirit and scope of my invention, as set forth in the accompanying claims.

I claim:

1. A device for lifting the driving wheels of a vehicle away from the roadway and supporting the lifted end of the vehicle on an auxiliary single wheel in combination with means for forming a driving connection between said single wheel and one of the elevated vehicle wheels while at the same time providing means for setting the service brake on the other elevated vehicle wheel.

2. A device for lifting the driving wheels of a vehicle away from the roadway and supporting the lifted end of the vehicle on a spare tire in combination with means for forming a driving connection between said spare tire and one of the elevated vehicle wheels while at the same time providing means for automatically setting the service brake on the other elevated vehicle wheel.

3. A device for lifting the driving wheels of a vehicle away from the roadway and supporting the lifted end of the vehicle on an auxiliary single wheel in combination with means for forming a driving connection between said single wheel and one of the elevated vehicle wheels and simultaneously with the lifting operation, auxiliary means operating automatically to set the service brake on the other elevated vehicle wheel.

4. A device for lifting the driving wheels of a vehicle away from the roadway and supporting the lifted end of the vehicle on an auxiliary spare tire in combination with means for forming a driving connection between said spare tire and one of the elevated vehicle wheels and simultaneously with the lifting operation, auxiliary means operating automatically to set the service brake on the other elevated vehicle wheel.

5. A device for lifting the driving wheels of a vehicle away from the roadway and supporting the lifted end of the vehicle on an auxiliary single wheel in combination with means for forming a friction driving connection between said single wheel and one of the elevated vehicle wheels while at the same time providing means for setting the service brake on the other elevated vehicle wheel.

6. A device for lifting the driving wheels of a vehicle away from the roadway and supporting the lifted end of the vehicle on an auxiliary single wheel in combination with means for forming a driving connection between said single wheel and one of the elevated vehicle wheels while at the same time providing means for setting the service brake on the other elevated wheel, said auxiliary wheel being at a substantial longitudinal distance from the center line of the elevated vehicle wheels.

7. A device for lifting the driving wheels of a vehicle away from the roadway and supporting the lifted end of the vehicle on auxiliary single wheel in combination with means for forming a driving connection between said single wheel and one of the elevated vehicle wheels while at the same time providing means for setting the service brake on the other elevated vehicle wheel, said driving means including a friction roller driving against the auxiliary wheel.

8. A device for lifting the driving wheels of a vehicle away from the roadway and supporting the lifted end of the vehicle on an auxiliary single wheel in combination with means for forming a driving connection between said single wheel and one of the elevated vehicle wheels while at the same time providing means for setting the service brake on the other elevated vehicle wheel, said driving means including a friction roller driving against the tread of the auxiliary wheel.

9. A device for lifting the driving wheels of a vehicle away from the roadway and supporting the lifted end of the vehicle on an auxiliary single wheel in combination with means for forming a driving connection between said single wheel and one of the elevated vehicle wheels while at the same time providing means for setting the service brake on the other elevated vehicle wheel, said driving connection including a friction roller driving against the side of the elevated vehicle wheel.

10. A device for lifting the driving wheels of a vehicle away from the roadway and supporting the lifted end of the vehicle on an auxiliary single wheel in combination with means for forming a driving connection between said single wheel and one of the elevated vehicle wheels while at the same time providing means for setting the service brake on the other elevated vehicle wheel, said drive including a friction drive against said first mentioned elevated wheel and a friction drive against the auxiliary single wheel.

11. A vehicle including a frame connected to axles and their associated wheels by means of resilient means, fluid pressure means for lifting one axle and its wheels away from the roadway and auxiliary automatic means including the lifting fluid pressure as an actuating means acting in a hydraulic cylinder between laterally movable hooks to lock the unelevated axle to the vehicle frame to eliminate the action of said resilient means there between.

12. The combination of a mounting for a spare tire which mounting is movable to move the spare tire into engagement with the ground for raising one end of said vehicle, of an auxiliary support for said vehicle attachable to said mounting in lieu of said spare tire, for raising said end of said vehicle on said support through the movement of said mounting.

13. The combination of a mounting for a spare tire which mounting is movable to move the spare tire into engagement with the ground for raising one end of said vehicle, of an auxiliary support for said vehicle attachable to said mounting in lieu of said spare tire, for raising said end of said vehicle on said support through the movement of said mounting, said spare tire and said auxiliary support being attached separately to said mounting by common means.

14. The combination of a mounting for a spare tire which mounting is movable to move the spare tire into engagement with the ground for raising one end of said vehicle, of an auxiliary support for said vehicle attachable to said mounting in lieu of said spare tire, for raising said end of said vehicle on said support through the movement of said mounting, said spare tire and said auxiliary support being attached separately to said mounting by common means, said auxiliary support being partially collapsible when disconnected from said mounting.

15. A device for lifting the wheels at one end of a vehicle away from the roadway and supporting said lifted end of the vehicle on a centrally disposed wheel the axis of which is disposed substantially at the longitudinal vertical central plane of said vehicle, in combination with means for forming a driving connection between said centrally disposed wheel and an elevated vehicle wheel.

16. A device for lifting the wheels at one end of a vehicle away from the roadway and supporting said lifted end of the vehicle on a centrally disposed wheel the axis of which is disposed substantially at the longitudinal vertical central plane of said vehicle, in combination with means for forming a driving connection between said centrally disposed wheel and an elevated vehicle wheel, said driving connection including a friction drive engaging the outer diameter of one of said wheels.

17. A device for lifting the wheels at one end of a vehicle away from the roadway and supporting said lifted end of the vehicle on a centrally disposed wheel the axis of which is disposed substantially at the longitudinal vertical central plane of said vehicle, in combination with means for forming a driving connection between said centrally disposed wheel and an elevated vehicle wheel, said driving connection including a friction roller bearing against one of said wheels, the axis of rotation of said roller bearing substantially parallel to the axis of rotation of the wheel against which it bears.

18. A device for lifting the wheels at one end of a vehicle away from the roadway and supporting said lifted end of the vehicle on a centrally disposed wheel in combination with means for forming a driving connection between said centrally disposed wheels and an elevated vehicle wheel, said driving connection including a friction roller bearing against one of said wheels the axis of rotation of said roller being substantially parallel to the axis of rotation of the wheel against which it bears and automatic means for disengaging said roller from said wheel when said vehicle lifting device is retracted.

BROOKS WALKER.

Patent No. 1,990,150  Granted February 5, 1935

BROOKS WALKER

The above entitled patent was extended July 24, 1951, under the provisions of the act of June 30, 1950, for 6 years and 214 days from the expiration of the original term thereof.

*Commissioner of Patents.*